US011819776B1

(12) United States Patent
Aamir et al.

(10) Patent No.: US 11,819,776 B1
(45) Date of Patent: Nov. 21, 2023

(54) SOLAR-POWERED SYSTEM FOR GENERATING STEAM AND DISTILLED WATER

(71) Applicant: KING FAISAL UNIVERSITY, Al-Ahsa (SA)

(72) Inventors: Muhammad Aamir, Al-Ahsa (SA); Nazeer Muhammad, Al-Ahsa (SA); Muhammad Sajid, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/163,168

(22) Filed: Feb. 1, 2023

(51) Int. Cl.
*B01D 3/02* (2006.01)
*B01D 1/00* (2006.01)
*B01D 5/00* (2006.01)
*C02F 1/14* (2023.01)
*F24S 10/40* (2018.01)

(52) U.S. Cl.
CPC ............. *B01D 1/0035* (2013.01); *B01D 3/02* (2013.01); *B01D 5/006* (2013.01); *C02F 1/14* (2013.01); *C02F 2201/009* (2013.01); *C02F 2301/08* (2013.01); *F24S 10/45* (2018.05)

(58) Field of Classification Search
CPC ........ B01D 1/0035; B01D 3/02; B01D 5/006; C02F 1/14
See application file for complete search history.

(56) References Cited

U.S. PATENT DOCUMENTS

| | | | | |
|---|---|---|---|---|
| 8,039,984 B2 * | 10/2011 | Ridnik | ..................... | F03G 6/005 |
| | | | | 290/2 |
| 8,356,481 B2 * | 1/2013 | Penev | ..................... | F03G 6/065 |
| | | | | 60/641.15 |
| 9,482,209 B2 * | 11/2016 | Huang | ..................... | F03G 6/003 |
| 10,436,519 B1 | 10/2019 | Longtin | | |
| 10,782,104 B2 | 9/2020 | Habib | | |
| 10,829,913 B1 * | 11/2020 | Ahmed | ..................... | C02F 1/441 |
| 2007/0227529 A1 * | 10/2007 | Rubio | ..................... | F24S 80/30 |
| | | | | 126/614 |
| 2008/0131830 A1 | 6/2008 | Nix | | |
| 2008/0236569 A1 | 10/2008 | Tuccio | | |
| 2010/0295306 A1 * | 11/2010 | Ridnik | ..................... | F03G 6/005 |
| | | | | 126/573 |
| 2011/0198208 A1 * | 8/2011 | Olwig | ..................... | C02F 1/441 |
| | | | | 203/10 |

(Continued)

*Primary Examiner* — Jonathan Miller
(74) *Attorney, Agent, or Firm* — Nath, Goldberg & Meyer; Richard C. Litman

(57) ABSTRACT

The solar-powered system for generating steam and distilled water includes a first conduit having an inlet for receiving a feed stream of water and an outlet for dispensing heated water. The first conduit has at least one steam vent for releasing at least a first volume of steam. At least one evacuated tube collector is in fluid communication with the first conduit for solar heating of the feed stream of water to produce the heated water and the at least first volume of steam. At least one boiler is in fluid communication with the first conduit for receiving a portion of the heated water for boiling thereof to produce a second volume of steam. At least one photovoltaic panel is in electrical communication with the at least one boiler for providing power thereto, and a condenser receives the second volume of steam for condensation thereof into distilled water.

16 Claims, 1 Drawing Sheet

(56) References Cited

U.S. PATENT DOCUMENTS

| | | | |
|---|---|---|---|
| 2011/0253127 A1* | 10/2011 | Lowe | F24D 17/0021 |
| | | | 29/890.036 |
| 2012/0047888 A1* | 3/2012 | Penev | F24S 23/71 |
| | | | 60/641.15 |
| 2012/0067338 A1* | 3/2012 | Funcheon | F03G 6/068 |
| | | | 126/714 |
| 2012/0073567 A1 | 3/2012 | Winston | |
| 2012/0291433 A1* | 11/2012 | Meng | F03G 6/005 |
| | | | 60/671 |
| 2013/0186121 A1 | 7/2013 | Erb et al. | |
| 2014/0190469 A1* | 7/2014 | O'Donnell | F22B 1/006 |
| | | | 126/609 |
| 2014/0197022 A1* | 7/2014 | Antar | C02F 1/14 |
| | | | 202/174 |
| 2014/0231327 A1* | 8/2014 | D'Alba | B01D 5/0066 |
| | | | 210/175 |
| 2014/0284201 A1* | 9/2014 | Remmert | B01D 3/06 |
| | | | 202/234 |
| 2016/0123309 A1* | 5/2016 | Huang | F24S 90/00 |
| | | | 126/646 |
| 2019/0241444 A1* | 8/2019 | Al-Sulaiman | B01D 1/30 |
| 2021/0260497 A1* | 8/2021 | Walker | C02F 1/06 |

\* cited by examiner

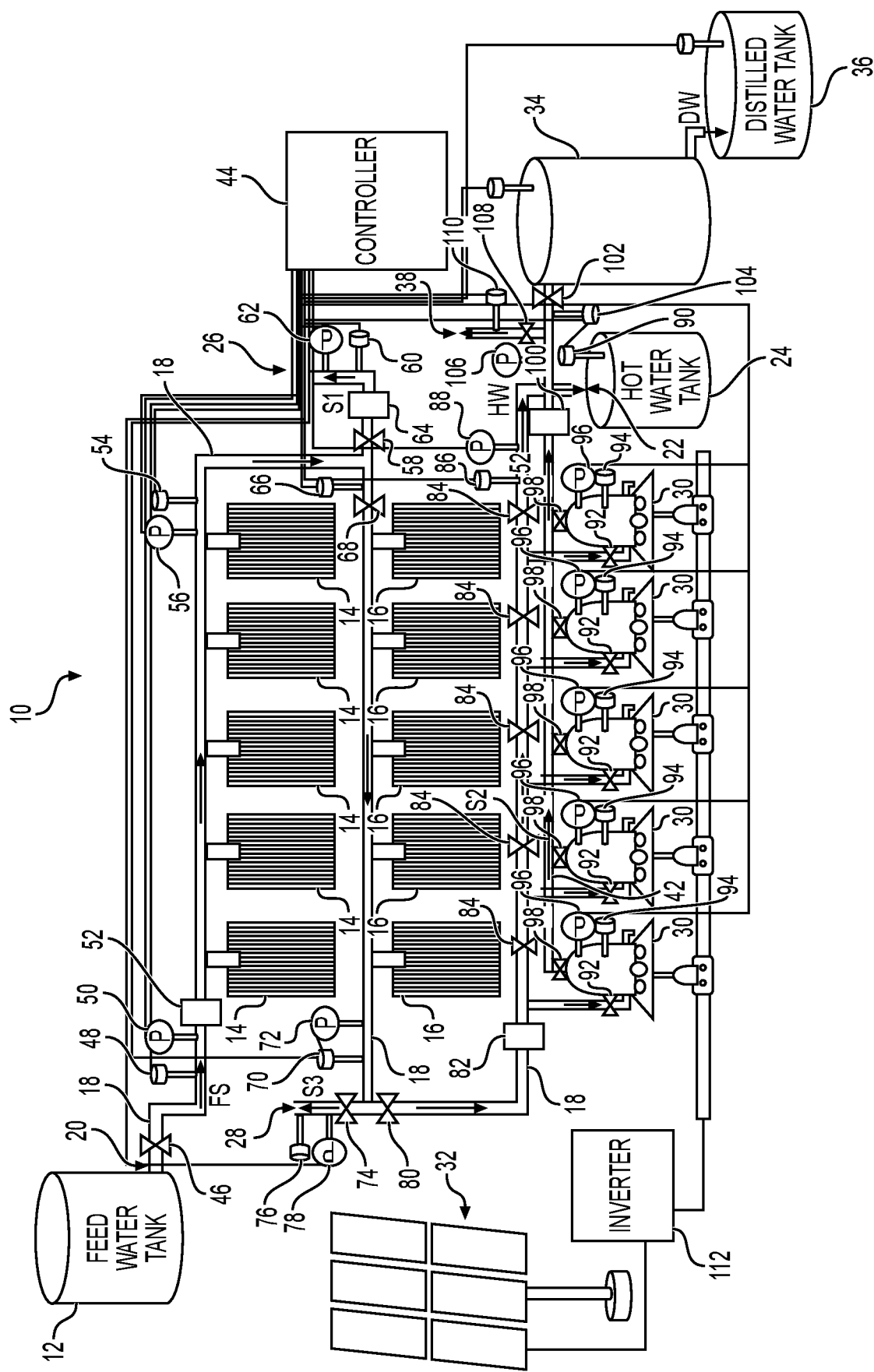

SOLAR-POWERED SYSTEM FOR GENERATING STEAM AND DISTILLED WATER

BACKGROUND

1. Field

The disclosure of the present patent application relates to water distillation and steam generation, and particularly to a solar-powered system for generating steam and distilled water from a feed water source.

2. Description of the Related Art

Rapid globalization and the constantly increasing human population, especially in large cities, have increased the requirements to improve water distillation and purification processes and minimize the energy requirements and adverse environmental impacts of present water purification plants. Although modern water purification processes have become more reliable and have expanded significantly during the last few decades, present water purification plants still consume large quantities of energy and release impurities and waste products into the environment.

Given the catastrophic climate change that the world is presently facing, there is great interest in converting large-scale processes, such as water purification, into environmentally friendly or "green" processes, particularly through the use of renewable power sources, such as solar power. In addition to the above, there is further interest in recycling or making use of the byproducts of a large-scale process, such as water purification, to create a secondary environmentally friendly energy source. Present water purification plants, for example, release waste heat and steam into the environment as byproducts without consideration for their use as an alternative energy source. Thus, a solar-powered system for generating steam and distilled water solving the aforementioned problems is desired.

SUMMARY

The solar-powered system for generating steam and distilled water includes a first conduit having an inlet for receiving a feed stream of water and an outlet for dispensing heated water. A feed water tank or the like is in fluid communication with the inlet of the first conduit for supplying the feed stream of water thereto, and a heated water tank or the like is in fluid communication with the outlet of the first conduit for receiving the heated water dispensed therefrom. The first conduit has at least one steam vent for releasing at least a first volume of steam. At least one evacuated tube collector is in fluid communication with the first conduit for solar heating of the feed stream of water to produce the heated water and at least the first volume of steam. For example, first and second arrays of evacuated tube collectors may be provided for the solar heating of the feed stream of water.

At least one boiler is in fluid communication with the first conduit for receiving a portion of the heated water for boiling thereof to produce a second volume of steam. At least one photovoltaic panel is in electrical communication with the at least one boiler for providing power thereto, and a condenser receives the second volume of steam for condensation thereof into distilled water. A second conduit is in fluid communication with the at least one boiler and the condenser for transferring the second volume of steam from the at least one boiler to the condenser. A distilled water tank or the like is in fluid communication with the condenser for receiving the distilled water therefrom These and other features of the present subject matter will become readily apparent upon further review of the following specification and drawings.

BRIEF DESCRIPTION OF THE DRAWINGS

The sole drawing FIGURE is a block diagram of a solar-powered system for generating steam and distilled water.

DETAILED DESCRIPTION OF THE PREFERRED EMBODIMENTS

As shown in the sole drawing FIGURE, the solar-powered system for generating steam and distilled water 10 includes a first conduit 18 having an inlet 20 for receiving a feed stream (FS) of water and an outlet 22 for dispensing heated water (HW). A feed water tank 12 or the like is in fluid communication with the inlet 20 of the first conduit 18 for supplying the feed stream of water thereto. It should be understood that feed water tank 12 may be any suitable reservoir for collecting and dispensing the feed water, or alternatively, may be replaced by a pressurized source of water, a water stream output from a separate process or plant, or the like. A heated water tank 24 or the like is in fluid communication with the outlet 22 of the first conduit 18 for receiving the heated water dispensed therefrom. It should be understood that heated water tank 24 may be any suitable reservoir for collecting heated water or, alternatively, may be replaced by a conduit or inlet to a separate process or plant or the like. As a further alternative, heated water tank 24 may be in communication with the feed water tank 12 for recycling of the heated water.

The first conduit 18 has at least one steam vent 26 for releasing at least a first volume of steam S1. At least one evacuated tube collector 14 is in fluid communication with the first conduit 18 for solar heating of the feed stream of water to produce the heated water and the at least the first volume of steam S1. In the exemplary sole drawing FIGURE, first and second arrays of evacuated tube collectors 14, 16 may be provided for the solar heating of the feed stream of water. It should be understood that the number of evacuated tube collectors shown in each of the arrays 14, 16 and the number of arrays are shown for exemplary purposes only, and that each array may contain any suitable number of evacuated tube collectors, and that the first conduit 18 may be in fluid communication with any suitable number of arrays. Further, although the first and second arrays 14, 16 are shown connected serially, it should be understood that any suitable connection or pathway between the first and second arrays 14, 16 may be used.

Each of arrays 14, 16 includes evacuated tube collectors, which, as is well-known in the art, each consist of a number of sealed glass tubes that have a thermally conductive copper rod or pipe inside, thus providing relatively high thermal efficiency and working temperatures. Evacuated tube collectors make use of individual rounded tubes, which are always arranged perpendicular to the sun's rays for most of the day. This accounts for operation of the evacuated tube collector at its high level of efficiency and temperature. Each evacuated tube collector includes a number of rows of parallel transparent glass tubes connected to a header pipe. These glass tubes are cylindrical in shape, thus providing the aforementioned effect of the angle of the sunlight always being perpendicular to the heat absorbing tubes.

As is well-known in the art, the glass tubes are actually dual or double tubes, i.e., each glass tube has a thick glass outer tube and a thinner glass inner tube, which is covered with an insulating coating that absorbs solar energy but inhibits heat loss. The tubes are typically made of borosilicate or soda lime glass, which is strong, resistant to high temperatures, and has a high transmittance for solar irradiation. Unlike flat panel collectors, for example, evacuated tube collectors do not heat the water directly within the tubes. Instead, air is removed or evacuated from the space between the two tubes, forming a vacuum. This vacuum acts as an insulator to reduce any heat loss to the surrounding atmosphere, either through convection or radiation, making the collector much more efficient than the internal insulating that flat plate collectors provide, for example.

Inside each glass tube, a flat or curved aluminum or copper fin is attached to a metal heat pipe running through the inner tube. The fin is covered with a selective coating that transfers heat to the fluid that is circulating through the pipe. This sealed copper heat pipe transfers the solar heat via convection of its internal heat transfer fluid to a "hot bulb" that indirectly heats a copper manifold within the header tank. These copper pipes are all connected to a common manifold, which is then connected to first conduit 18, thus heating the feed stream.

At least one boiler 30 is in fluid communication with the first conduit 18 for receiving a portion of the heated water for boiling thereof to produce a second volume of steam S2. It should be understood that the five boilers 30 shown in the sole drawing FIGURE are shown for exemplary purposes only, and that any suitable number of boilers may be used. Further, it should be understood that any suitable type of boiler may be used. For example, the boilers 30 may be induction heaters. At least one photovoltaic panel 32 is in electrical communication with the at least one boiler 30 for providing power thereto. It should be understood that any necessary electronics, such as an inverter 112 or the like, may be used to regulate or modulate the electrical current generated by the at least one photovoltaic panel 32 prior to its powering of the at least one boiler 30. It should be further understood that any suitable type of solar concentrator or solar reflector may be provided for concentrating sunlight on the at least one photovoltaic panel 32 and/or the first and second arrays of evacuated tube collectors 14, 16.

A condenser 34 receives the second volume of steam S2 for condensation thereof into distilled water (DW). It should be understood that the condenser 34 may be any suitable type of condenser. For example, the condenser 34 may have a condenser coil contained therein, with cooling provided by the ambient environment or, alternatively, by a refrigerator, chiller or the like, which may be at least partially powered by the at least one photovoltaic panel 32. A second conduit 42 is in fluid communication with the at least one boiler 30 and the condenser 34 for transferring the second volume of steam S2 from the at least one boiler 30 to the condenser 34. A distilled water tank 36 or the like is in fluid communication with the condenser 34 for receiving the distilled water therefrom.

In the exemplary sole drawing FIGURE, the first conduit 18 has a first steam vent 26 for releasing the first volume of steam S1, which is produced by the first array of evacuated tube collectors 14. The second array of evacuated tube collectors 16 further heats the water and a second steam vent 28 is provided for releasing a third volume of steam S3. It should be understood that the first and third volumes of steam S1, S3 may be released into the ambient environment, or alternatively, may be routed to the condenser 34, or as a further alternative, may be used to generate power using, for example, a connected turbine generator.

A controller 44 is provided for monitoring and controlling the various fluid flows throughout the solar-powered system 10 for generating steam and distilled water. It should be understood that any suitable type of controller may be used, such as a computer, a processor, a programmable logic controller, or the like. A valve 46 is in communication with the controller 44 for controlling the flow of the feed stream into first conduit 18. The temperature, pressure and flow rate of the feed stream entering the first conduit 18 may be monitored by a thermocouple 48, a pressure sensor 50, and a fluid mass flow meter 52, respectively, each being in communication with the controller 44. The temperature and pressure of the feed stream after its first stage of heating by the first array of evacuated tube collectors 14 may be monitored by a thermocouple 54 and a pressure sensor 56, respectively, each being in communication with the controller 44.

The flow of the first volume of steam S1 may be controlled by a valve 58, and the temperature, pressure and flow rate of the first volume of steam S1 exiting through the first steam vent 26 may be monitored by a thermocouple 60, a pressure sensor 62, and a fluid mass flow meter 64, respectively, each being in communication with the controller 44. The temperature of the feed stream about to be heated by the second array of evacuated tube collectors 16 may be measured by a thermocouple 66, and the flow thereof may be controlled by a valve 68, each being in communication with the controller 44. The temperature of the feed stream following heating by the second array of evacuated tube collectors 16 may be measured by a thermocouple 70, and the pressure thereof may be measured by a pressure sensor 72, each being in communication with the controller 44.

The flow of the third volume of steam S3 may be controlled by a valve 74, and the temperature and pressure of the third volume of steam S3 exiting through the third steam vent 28 may be monitored by a thermocouple 76 and a pressure sensor 78, respectively, each being in communication with the controller 44. Control of the flow of the heated feed stream from the second array of evacuated tube collectors 16 to the at least one boiler 30 may be controlled by a valve 80, and the flow rate thereof may be monitored by a fluid mass flow meter 82, each being in communication with the controller 44. Valves 84 may be provided for controlling the flow in between each of the boilers 30, the number of valves 84 being dependent upon the number of boilers 30.

The temperature and pressure of the heated water exiting the first conduit 18 through the outlet 22 may be monitored by a thermocouple 86 and a pressure sensor 88, respectively, each being in communication with the controller 44. The temperature of the heated water collected in the hot water tank 24 may be measured by a thermocouple 90, which is in communication with the controller 44.

The flow of heated water into each boiler 30 may be controlled by a respective valve 92, and the temperature and pressure within each boiler 30 may be monitored by a corresponding thermocouple 94 and pressure sensor 96, respectively, each being in communication with the controller 44. The flow of the second volume of steam S2 out of each boiler 30 may be controlled by a respective valve 98, each in communication with the controller 44. The rate of flow of the second volume of steam S2 to the condenser 34 may be monitored by a fluid mass flow meter 100, and the flow thereof into the condenser 34 may be controlled by a valve 102, each in communication with the controller 44. The temperature and pressure thereof may be monitored by a thermocouple 104 and a pressure sensor 106, respectively, each also in communication with the controller 44.

Excess steam may be vented through the third steam vent 38 under the control of a valve 108. The temperature thereof may be monitored by a thermocouple 110. The valve 108 and the thermocouple 110 are each in communication with the controller 44. It should be understood that each of the valves described above may be any suitable type of valve for controlling the flow of water or steam. Similarly, it should be understood that the thermocouples described above may be replaced by, or used in conjunction with, any other suitable type of temperature sensor. It should be further understood that the pressure sensors described above may be any suitable type of pressure sensors. Further, it should be understood that the flow meters described above may be any suitable type of liquid/gas volume/mass flow meters.

It is to be understood that the solar-powered system for generating steam and distilled water is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A solar-powered system for generating steam and distilled water, comprising:
   a first conduit having an inlet for receiving a feed stream of water, said feed stream of water also including impurities, and an outlet for dispensing heated water, the first conduit further having at least one steam vent for releasing at least a first volume of steam;
   at least one evacuated tube collector in fluid communication with the first conduit for solar heating of the feed stream of water to produce the heated water and the at least first volume of steam;
   at least one boiler in fluid communication with the first conduit for receiving a portion of the heated water, the at least one boiler boiling the portion of the heated water to produce a second volume of steam;
   at least one photovoltaic panel in electrical communication with the at least one boiler for providing power thereto; and
   a condenser connected to the first conduit, the condenser receiving the second volume of steam and condensing the second volume of steam into distilled water.

2. The solar-powered system for generating steam and distilled water as recited in claim 1, wherein the at least one evacuated tube collector comprises at least one array of evacuated tube collectors.

3. The solar-powered system for generating steam and distilled water as recited in claim 2, wherein the at least one array of evacuated tube collectors comprises first and second arrays of evacuated tube collectors in series connection.

4. The solar-powered system for generating steam and distilled water as recited in claim 3, wherein the at least one steam vent of the conduit comprises a first steam vent for releasing the first volume of steam and a second steam vent for releasing a third volume of steam.

5. The solar-powered system for generating steam and distilled water as recited in claim 1, further comprising a second conduit in fluid communication with the at least one boiler and the condenser for transferring the second volume of steam from the at least one boiler to the condenser.

6. The solar-powered system for generating steam and distilled water as recited in claim 5, wherein the second conduit has a third steam vent for selectively releasing a portion of the second volume of steam.

7. The solar-powered system for generating steam and distilled water as recited in claim 1, further comprising a feed water tank in fluid communication with the inlet of the first conduit for supplying the feed stream of water thereto.

8. The solar-powered system for generating steam and distilled water as recited in claim 7, further comprising a heated water tank in fluid communication with the outlet of the first conduit for receiving the heated water dispensed therefrom.

9. The solar-powered system for generating steam and distilled water as recited in claim 8, further comprising a distilled water tank in fluid communication with the condenser for receiving the distilled water therefrom.

10. A solar-powered system for generating steam and distilled water, comprising:
    a first conduit having an inlet for receiving a feed stream of water, said feed stream of water also including impurities, and an outlet for dispensing heated water, the first conduit further having at least one steam vent for releasing at least a first volume of steam;
    first and second arrays of evacuated tube collectors, each of the arrays being in fluid communication with the first conduit for solar heating of the feed stream of water to produce the heated water and at least the first volume of steam;
    at least one boiler in fluid communication with the first conduit for receiving a portion of the heated water, the at least one boiler boiling the portion of the heated water to produce a second volume of steam;
    at least one photovoltaic panel in electrical communication with the at least one boiler for providing power thereto; and
    a condenser connected to the first conduit, the condenser receiving the second volume of steam and condensing the second volume of steam into distilled water.

11. The solar-powered system for generating steam and distilled water as recited in claim 10, wherein the at least one steam vent of the conduit comprises a first steam vent for releasing the first volume of steam and a second steam vent for releasing a third volume of steam.

12. The solar-powered system for generating steam and distilled water as recited in claim 10, further comprising a second conduit in fluid communication with the at least one boiler and the condenser for transferring the second volume of steam from the at least one boiler to the condenser.

13. The solar-powered system for generating steam and distilled water as recited in claim 12, wherein the second conduit has a third steam vent for selectively releasing a portion of the second volume of steam.

14. The solar-powered system for generating steam and distilled water as recited in claim 10, further comprising a feed water tank in fluid communication with the inlet of the first conduit for supplying the feed stream of water thereto.

15. The solar-powered system for generating steam and distilled water as recited in claim 14, further comprising a heated water tank in fluid communication with the outlet of the first conduit for receiving the heated water dispensed therefrom.

16. The solar-powered system for generating steam and distilled water as recited in claim 15, further comprising a distilled water tank in fluid communication with the condenser for receiving the distilled water therefrom.

\* \* \* \* \*